May 27, 1947.  F. TOTNEY  2,421,094
TREATMENT OF WOOL-WASHING EFFLUENT
Filed Sept. 11, 1944  2 Sheets-Sheet 2
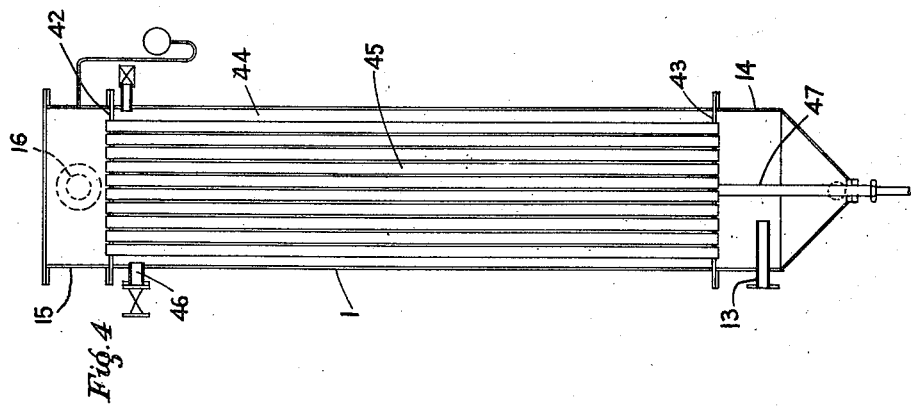
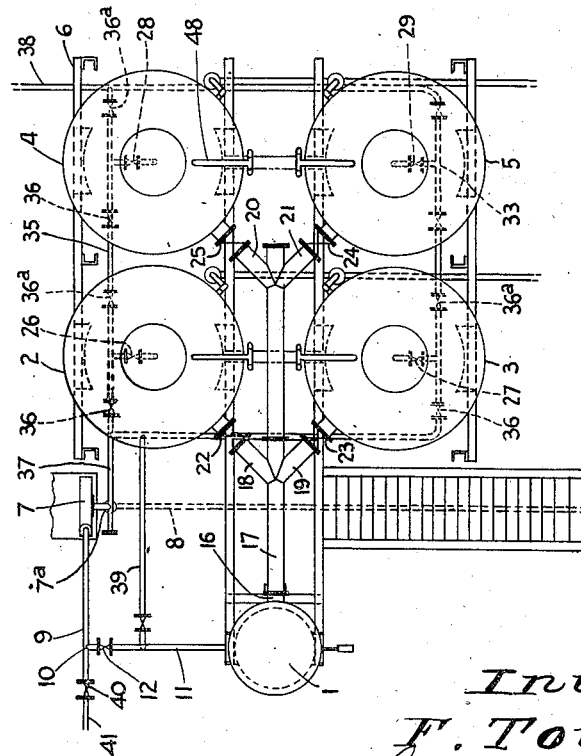
Inventor
F. Totney Patented May 27, 1947

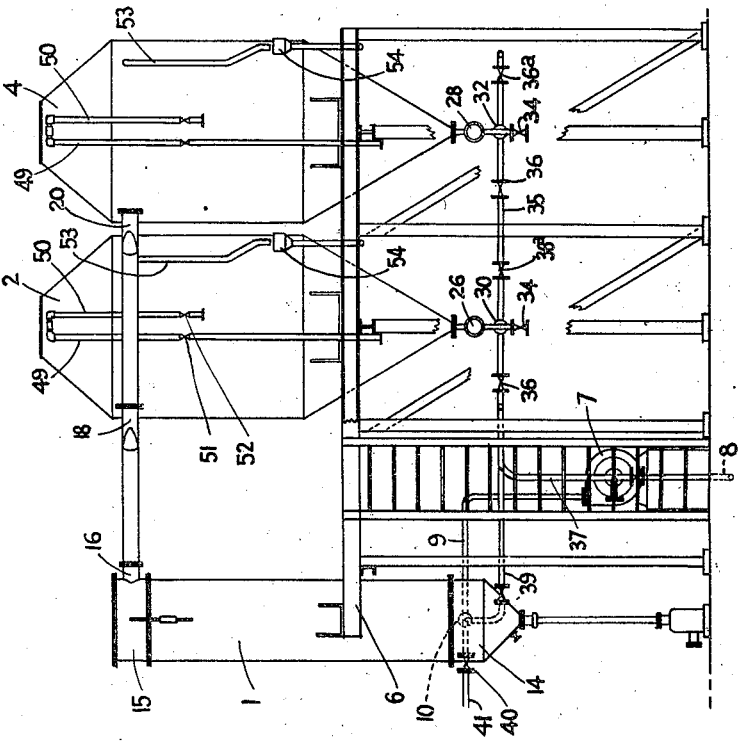
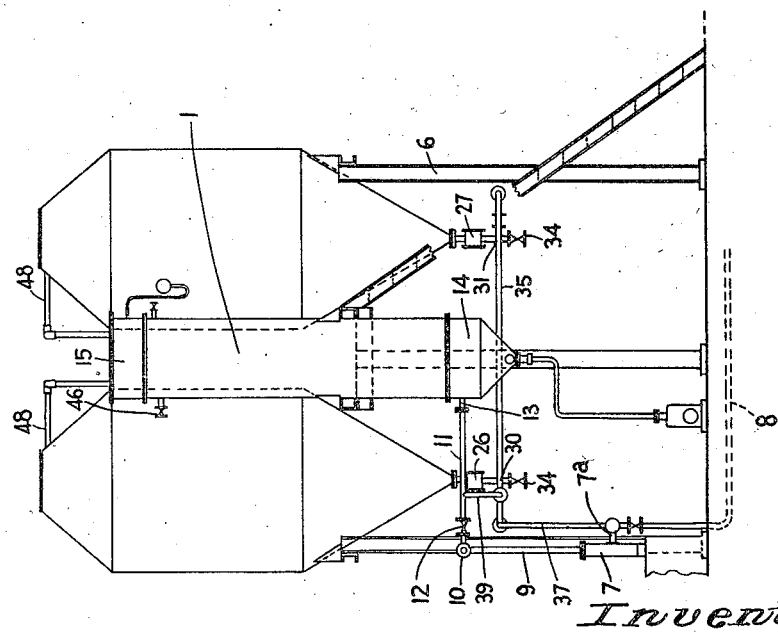

2,421,094

UNITED STATES PATENT OFFICE 2,421,094

TREATMENT OF WOOL-WASHING EFFLUENT

Frank Totney, Hillbrow, Johannesburg, Transvaal, Union of South Africa, assignor to Industrial Development Corporation of South Africa, Limited, Johannesburg, Transvaal, Union of South Africa, a corporation of South Africa Application September 11, 1944, Serial No. 553,643
In the Union of South Africa April 20, 1944

3 Claims. (Cl. 260—412.5)

This invention relates to the treatment of wool-washery effluent and has particular reference, on the one hand, to the recovery of wool grease and other useful substances in the effluent, and, on the other hand, to the disposal of the effluent thereafter into the normal sewage channels, stream, river or like, or to other plant for further treatment.

Hitherto, the treatment of wool-washery effluent has been carried out in one or other of various methods all of which have some shortcoming, so that their choice and installation by wool washeries is governed more by the necessity to render the effluent suitable for discharge into streams, rivers or the like, rather than as units installed as integral parts of wool washery economy.

A brief description of other widely used methods is given below for the purpose of illustrating the type of shortcoming referred to above:

1. The "Magna" process or the acid-cracking process in which the waste liquors are treated with a slight excess of sulphuric acid. The "cracked" liquors are run into settling tanks where separation into three layers takes place. On the top is a scum of grease and fine dirt; on the bottom is a layer of heavy dirt; and between them is a layer of clear acid liquor. This scum is collected and the contaminating dirt is removed by one of the various methods of filtration or by hydraulic presses. The middle layer of clear water is run directly to waste. It is sometimes necessary to neutralise or partly neutralise this water when it is discharged into sewers and rivers. The bottom layer of heavy mud is disposed of by the most convenient method, as spreading over an open field to dry.

Strictly speaking, the acid-cracking process is not a grease recovery process at all, as its primary intent is to bring waste scouring liquor to a condition meeting the requirements of local authorities on stream and sewage regulations. This is performed admirably from a quality standpoint but the economics leave much to be desired. The acid degras produced is entirely unsuitable as a source of high grade wool grease or lanolin as it contains some twelve to eighteen per cent of free fatty acids and is very dark in colour. The process as a whole is invariably operated at a considerable loss.

2. The "Battage" process, in which the liquors are subjected to a series of fine air streams whereby the grease rises as a froth to the surface of the liquor: The froth is washed and eventually recovered free from dirt and water by heating in a low pressure autoclave. Recovery is of the same order as in the centrifugal process to be mentioned below. The process is a cumbersome one, very often messy, and the economics are such that it does not appear to present any decided advantage over the other processes mentioned.

3. Centrifugal methods.— Although a high quality product can be obtained by the use of centrifugal machines the capital and maintenance expenditures are high, and the installation in any but the large and more modern washeries is difficult to justify.

4. Where the solvent process of scouring is used the recovery of grease is carried out by distilling off the solvent. My invention does not relate to wool washeries in which the solvent method of scouring is used.

5. Combinations of the above methods may be used which in cases will give slightly improved results, but in no case yet known has adaptability of my process been equalled.

The object therefore of the present invention is to provide an improved process of, and apparatus for, the treatment of wool-washing effluent which, firstly, will result in a substantially higher yield of wool grease being obtained, secondly, will enable wool grease, suint and residual muddy liquor to be separated either wholly without mechanical aid or with a minimum of such aid, and thirdly, enable the disposal of wool-washing effluent and the recovery of wool grease and other useful constituents to be effected in a manner which will, on the one hand, avoid objectionable pollution of sewage channels, streams, and the like, and on the other hand, make available a supply of wool grease or other useful constituents in sufficient quantity and of sufficient quality as to make the manufacture of wool grease or other constituents a satisfactory industrial undertaking.

According to one feature of the invention, I provide a process of treating wool-washery effluent in which, firstly, the effluent is evaporated to a point which will produce a minimum content of 4 to 5 per cent of wool grease, which requires the evaporation of about one half the water present, in which, secondly, the effluent is heated in an autoclave until a temperature of about 290° to 302° F. is obtained at 50 pounds gauge pressure or thereabout, and in which, lastly, the effluent is allowed to settle for a period of from about one to eight hours in the autoclave so as to separate the grease, suint and muddy liquor from one another.

When settling in the autoclave is complete, the contents is simply run off through an outlet at the bottom in successive batches to the respective vessel, dump or the like for which they are intended.

The grease recovered by the process described is of a high quality and of a grade usually described as "neutral" and is substantially free from water.

During wool scouring, as is well known, the scouring agents, viz, soap and soda ash, are used up, and continuous additions of the fresh materials have to be made in order to maintain the scouring qualities of the liquor. I find that the regenerative properties of the recovery process, together with the natural alkali and detergent compounds in the wool, by the return of the clear middle portion from the autoclave, enables considerable reduction in the amount of soap and soda ash additions required. Thus, in a case in which 16 lbs. of soap and 16 lbs. of soda were normally used for each 1,000 lbs. of grease wool scoured it has been found possible with the aid of my invention to reduce the soap and soda consumption to only 2 lbs. each per 1,000 lbs. of grease wool, and, at times, to reduce this for months to no addition. The formation and colour of the wools in the latter instance were distinctly improved.

According to another feature of the invention, I provide an apparatus for the treatment of wool-washery effluent which comprises, in combination, an autoclave or settling vessel, a steam or other heater, a circulating system whereby effluent may be circulated from the bottom of the autoclave to the inlet end of the heater and from the outlet end of the heater to the top of the autoclave, means for interrupting the circulation of the wool grease, suint and mud within the apparatus, and means whereby the separated constituents can be drawn off in successive batches from the apparatus.

By causing the effluent to circulate continuously through the heater, instead of heating it as a stationary body of liquor, the time occupied in raising the effluent to a desired temperature (e. g. from about 290° F. to 302° F. at a gauge pressure of 50 lb. per sq. inch) is considerably reduced. For example, it has been found that the heating and subsequent settling of the grease, suint and mud takes only about one half to six hours with my improved apparatus and yields approximately five per cent grease, 65 per cent suint and 30 per cent mud, as compared with a time of 16 to 24 hours and a yield of about 5 per cent grease, 47½ per cent suint and 47½ per cent mud in the case of an apparatus in which the effluent is heated as a stationary body of liquor.

In carrying out the invention, it is possible to make one steam or other heater serve for the purpose of heating the contents of a number of different autoclaves or settling tanks in succession. Thus, in a preferred form of my apparatus, two, four or more autoclaves are mounted in a framework which also supports a single steam heater, and are connected to a circulating system whereby any of the autoclaves may be connected up with the heater to permit circulation of the effluent from the bottom of the autoclave to the inlet end of the heater and from the outlet end of the heater to the top of the autoclave, while the remaining autoclaves are cut off from the heater, as, for example, for the purpose of permitting the settling of effluent in any autoclave subsequent to heating, or the running off of the settled contents of any autoclave.

With the multiple autoclave apparatus just described, it is possible to keep the heater more or less fully occupied and to carry on the treatment of effluent more or less continuously. No part of the apparatus is then kept standing idle, and the fixed capital to be invested in the apparatus is thus reduced to a minimum.

The invention will now be described, by way of example, with reference to the accompanying drawings, in which:

Fig. 1 is an end elevation to a greatly reduced scale of an apparatus embodying the invention.

Fig. 2 is a side elevation of the apparatus, with the two nearer settling tanks or autoclaves removed.

Fig. 3 is a plan view of the apparatus.

Fig. 4 is a relatively enlarged view of the heater of the apparatus in vertical half-section.

Referring to the drawings:

The apparatus comprises a heater 1 and a plurality of settling tanks or autoclaves 2, 3, 4 and 5 supported on a level with one another in a framework 6.

The intake 7a of a pump 7 communicates through a pipe 8 with the supply tank (not shown) containing the wool-washery effluent of suitable concentration. A pipe 9 connects the delivery side of the pump 7 with a distribution piece 10. From this, a pipe 11 (Fig. 1) leads through a valve 12 to the effluent inlet 13 which enters the lower or inlet manifold 14 of the heater 1.

At the top of the heater 1, an outlet manifold 15 is provided, from which there opens an effluent outlet 16. This outlet communicates with a central pipe 17 from which branch pipes 18, 19, 20 and 21 (Fig. 3) are led through valves 22, 23, 24 and 25 into the upper portion of the autoclaves 2, 3, 4 and 5 respectively.

The autoclaves 2, 3, 4, 5 are made conical towards the bottom and at the central or lowermost portion valves or outlets 26, 27, 28 and 29 are provided. These outlets communicate with distribution pieces 30, 31, 32, 33 respectively. On the bottom of each of these distribution pieces, there is fitted a valve 34. In addition, each distribution piece 30, 31, 32 or 33 communicates with piping 35 which, as shown in Fig. 3, constitutes a closed circuit fitted at points on opposite sides of the distribution pieces 30 to 33 with valves 36, 36a. A pipe 37 acts as a communication between the circuit piping 35 and the intake 7a of the pump 7. Another pipe 38 acts as a communication between the piping 35 and a reservoir (not shown) for the suint which is to be returned from the autoclaves to the wool washery. A further pipe 39 is led from the piping 35 to the pipe 11, which latter communicates through the valve 12 with the pipe 9, one end of which as aforesaid communicates with the delivery side of the pump 7 whilst the other end communicates through a valve 40 with a pipe 41 leading to a collector or deposit site for the mud.

As shown in Fig. 4, the heater 1 comprises top and bottom plates 42 and 43 between which a steam space 44 is constituted. This space is traversed by a nest of pipes 45 which is seated in steam-tight manner in holes in the plates 42, 43. A steam inlet 46 is provided at the top of the space 44 and a condensate and steam draw-off pipe 47 is provided at the bottom.

The autoclaves 2, 3, 4 and 5 are each provided at the top with an inlet pipe 48 which may be supplied with steam and compressed air through pipes 49 and 50 respectively (or with steam only or air only) according to the setting of the valves 51 and 52. An overflow pipe 53 and sight-flow cup 54 are also provided on each autoclave.

The operation of the apparatus described is as follows:

The effluent from the wool washery (after its preliminary partial evaporation to obtain a minimum content of from 4% to 5% of wool grease as aforesaid) is admitted into the apparatus from the pipe 8 and fed by the pump 7 through the pipe 9, distribution piece 10, pipe 11, valve 12 and inlet 13 into the lower manifold 14 of the heater 1.

The autoclaves 2 to 5 are used independently and, assuming that the autoclave 2 is to be used, the effluent will be pumped from the lower manifold 14 of the heater 1 up through the steam-heated pipes 45 and thence through the upper manifold 15, outlet 16, central pipe 17, branch pipe 18, and valve 22 into the upper portion of the autoclave 2.

The effluent will thence be circulated down through the autoclave 2 out through the outlet 26 to distribution piece 30 and then by way of the circuit piping 35, valve 36, and pipe 37 to the intake 7a of the pump 7. This completes the circulation, and the effluent delivered by the pump follows the same cycle until the whole body of effluent in the heater 1, autoclave 2 and associated piping is raised to the predetermined temperature, viz., as already stated, at about from 290° F. to 302° F. at a gauge pressure of about 50 lbs. per sq. inch.

When the effluent has been uniformly raised to this temperature, the autoclave 2 is cut off from the heater 1 by closing the appropriate valves 22 and 36 and, if necessary, shutting off the pump 7. The body of effluent in the autoclave 2 is then allowed to settle, and settling, in general, is completed in from 1 to 8 hours.

The grease, suint and mud will then have separated by gravity. In order to draw off the mud (which occupies the lower portion of the autoclave 2) the valve 36 on the pump side of the distribution piece 30 is opened, while the valve 36a on the opposite side is closed, whereupon the mud or muddy liquor flows through the circuit piping 35 and pipe 37 to the intake 7a of the pump 7 which discharges it to the mud collector or deposit site through the pipe 41.

When all the mud has thus been drawn off from the autoclave 2, the valve 36 is closed and the opposite valve 36a is opened, whereupon the suint (which, with the removal of the mud, will now be at the bottom of the autoclave) is run back to the wool washery for re-use through the distribution piece 30, valve 36a, piping 35 and pipe 38.

Only the wool grease will now be contained in the autoclave 2, and this is run off by closing both valves 36, 36a aforesaid and opening valve 34, whence the grease runs through piping (not shown) to an appropriate vessel or the like for collection or treatment.

If necessary, in order to prevent bubbling or turbulence of the contents of the autoclave 2 when the constituents are being removed after settling, steam and/or air may be admitted to the top of the autoclave through the pipe 48, pipes 49 and/or 50 and valves 51 and/or 52.

As will be appreciated, while the effluent in the autoclave 2 is settling and the constituents are being run off, the other autoclaves 3, 4 and 5, or any one or more of these autoclaves, may be used similarly to treat other batches of effluent heated by circulation through the heater 1.

I claim:

1. The process of treating woolwashery effluents which comprises evaporating the effluent until a content of about 4 to 5 per cent of wool grease is obtained, thereby increasing the alkali content in the effluent, then heating the concentrated effluent to a temperature of from about 290 to 302° F. and a gauge pressure of about 50 pounds per square inch, and settling the so-treated effluent for a period of from about one to eight hours to separate the grease, suint and muddy liquor from each other.

2. A process of treating woolwashery effluent, according to claim 1, in which the effluent to be heated is circulated in a closed circuit through a heating zone and a pressure treating zone and in which circulation takes place from the bottom of the pressure treating zone to the bottom of the heating zone and thence from the top of the heating zone to the top of the pressure treating zone.

3. A process of treating woolwashery effluent, according to claim 1, comprising the step of running off and collecting the muddy liquor suint and wool grease in successive batches separately when settling has been completed.

FRANK TOTNEY.

REFERENCES CITED

The following references are of record in the file of this patent:

UNITED STATES PATENTS

| Number | Name | Date |
|---|---|---|
| 1,853,871 | Mertens | Apr. 12, 1932 |
| 1,110,277 | Abbott | Sept. 8, 1941 |
| 475,395 | Griffin | May 24, 1892 |
| 2,260,710 | Gschwind | Oct. 28, 1941 |

FOREIGN PATENTS

| Number | Country | Date |
|---|---|---|
| 360,209 | Great Britain | Nov. 5, 1931 |